United States Patent [19]

Spies, Jr.

[11] 3,907,263

[45] Sept. 23, 1975

[54] CONDENSATE COLLECTION MEANS

[75] Inventor: George R. Spies, Jr., Alamo, Calif.

[73] Assignee: Airco, Inc., Montvale, N.J.

[22] Filed: Apr. 23, 1974

[21] Appl. No.: 463,230

[52] U.S. Cl............. 266/34 R; 266/34 V; 118/49.1; 118/49.5
[51] Int. Cl.............................................. C21c 7/00
[58] Field of Search............ 118/49.1, 49.5; 425/7; 164/50, 61, 250, 254; 266/19, 34 R, 34 V; 13/31

[56] References Cited
UNITED STATES PATENTS

| | | | |
|---|---|---|---|
| 2,330,143 | 9/1943 | Pidgeon | 266/19 X |
| 3,526,206 | 9/1970 | Jones | 118/49.1 |
| 3,690,635 | 9/1972 | Harker et al. | 266/34 R |

Primary Examiner—Roy Lake
Assistant Examiner—Paul A. Bell
Attorney, Agent, or Firm—Larry R. Cassett; Edmund W. Bopp; H. Hume Mathews

[57] ABSTRACT

Condensate collection means are disclosed for use in a furnace for processing materials subject to vaporization wherein condensate is collected on a flat collection plate and one or more flat mesh structures positioned to condense the vapor. The one or more mesh structures allow vapor to first pass through to the collection plate and condense and also prevent the solid condensate particles from falling back toward the vapor source.

8 Claims, 6 Drawing Figures

CONDENSATE COLLECTION MEANS

BACKGROUND OF INVENTION

1. Field of the Invention

This invention relates generally to the processing of materials subject to vaporization and, more particularly, to an improved means for collecting condensate in a furnace for processing materials subject to vaporization.

2. Description of Prior Art

This invention is an improvement over the condensate collection means shown and described in U.S. Pat. No. 3,690,635 assigned to the assignee of the present invention. The condensate collection means disclosed in this patent takes the form of a partially cylindrical canopy. This particular configuration was selected because it was believed such a shape would collect and trap all of the ascending vapor during operation of a furnace.

Although this configuration successfully trapped essentially all of the vapor maintaining the configuration, e.g., the cylindrical shape was difficult. During the operation of the furnace the structure is subject to intense heat. This heat acts to warp and distort the structure. Providing supporting braces and stiffeners on the upper curved surface of the collection plate was difficult from a fabrication point of view. The inner surface of the plate could not be practically strengthened without interference with vapor collection.

Another disadvantage with the condensate collection means described in this patent was difficulty in cleaning and removing condensed particles. It frequently required many man hours to satisfactorily clean a condensate collection means after it was removed from the furnace proper.

A modified construction was then employed in such furnaces for processing materials subject to vaporization. The configuration was similar to the previously described canopy; however, the collecting surface was no longer cylindrical. This new construction consisted of a flat central portion and a pair of cantilever portions projecting downwardly in an angular manner from opposite ends of the central portion. The ends of the cantilever portions were connected to a member that was essentially horizontal and parellel to the central portion. These cantilever portions were approximately one-half the length of the central portion. The overall appearance was similar to the partially cylindrical canopy previously discussed. However, this structure was easier to assemble and maintain in shape because the curved cylindrical configuration was eliminated.

Each section, the central portion and the two cantilever portions, contained three mesh structures with different size mesh. The complete collection means therefore contained nine different screens. Furthermore, there were three large screens and six small screens. This variety of screen and mesh sizes presented a materials problem in that different size screens, containing several different mesh, had to be kept in inventory. Although this modified construction was sturdier and more durable, it proved as difficult to clean and maintain as the cylindrical canopy. As a matter of fact, removing and cleaning nine screens would be more time consuming than cleaning the screens in the original construction.

A simple expedient for rapidly cleaning the condensate collection means is merely drop it onto the melt shop floor. Dropping rapidly dislodges substantially all adhered condensate. Unfortunately, the collection means must be very sturdy to withstand this rough treatment, otherwise the weight of the collection means would cause severe distortion to the collection plate and mesh structures.

SUMMARY OF THE INVENTION

In accordance with my invention, as hereinafter more fully described, I provide an improved condensate collection means for use in a furnace for processing materials subject to vaporization wherein condensate is collected on a flat collection plate and one or more flat mesh structures positioned to condense the vapor.

The condensate collection means of this invention basically comprises four principal components: a collection plate, a stiffening frame, positioning means, and a mesh structure. Furthermore, it is sturdy, durable, and capable of withstanding distortion from elevated temperatures and rough handling. Prolonged exposure does not distort or warp the collection means. The collection means stiffening frame contains longitudinal, transverse, and diagonal members and is fastened onto the collection plate surface that is not exposed to the ascending metallic vapor. This form of construction produces a sturdy condensate collection means. Cleaning and maintenance of the condensate collection means is quite simple. The collection means is so sturdy and strong it can now be dropped onto the melt shop floor without damage. By dropping the collection means a substantial portion of the condensed vapor merely falls off. Furthermore, the construction is such that by loosening a series of fasteners the clogged mesh structure can be rapidly removed. The more tenaciously adhering condensate can then be brushed or vibrated off. The overall time to clean the collection means is considerably less than prior art construction.

Accordingly, it is an object of this invention to provide an improved condensate collection means.

It is a further object of this invention to provide a sturdy condensate collection means capable of withstanding thermal shock and physical abuse.

Another object of this invention is to provide a condensate collection means that is easy to clean and maintain.

DESCRIPTION OF THE PREFERRED EMBODIMENT

The foregoing objects and further objects of this invention will be understood by those skilled in the art from the following detailed description of the invention, taken in connection with the accompanying drawings.

Figure 1:
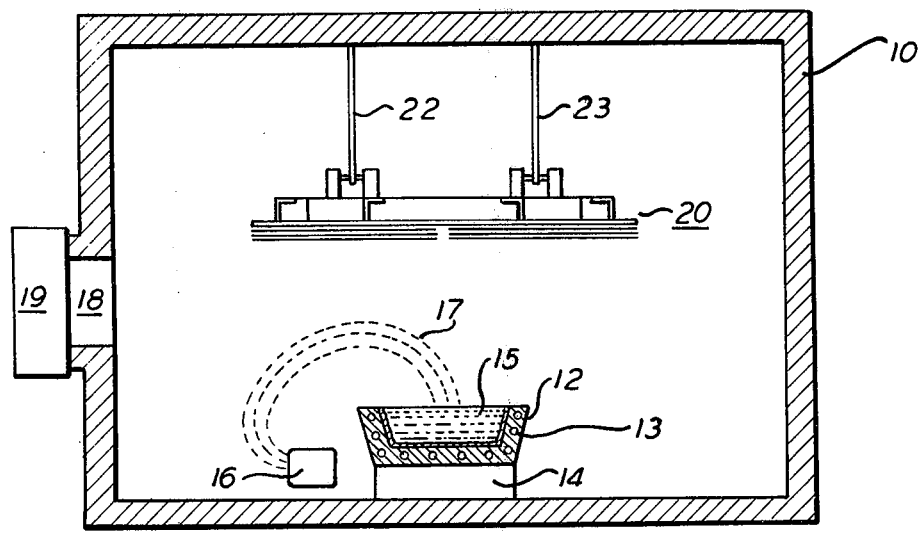
FIG. 1 is schematic illustration of a vacuum furnace incorporating the substantially unitary planar condensate collecting means of the present invention.

FIG. 1 shows the invention installed within an enclosure 10 having a crucible 12 for containing a vaporizable material 15 being processed. Positioned above the crucible and in the path of ascending vapor flow is condensate collection means 20.

In the embodiment illustrated in FIG. 1, enclosure 10 is a vacuum furnace. The furnace is an air-tight enclosure having a port 18 through which the furnace may be evacuated by means of a vacuum pump 19. The actual configuration of the furnace depends upon the particular process employed therein and it therefore may take any number of forms. A typical furnace is of an elongated configuration wherein a plurality of crucibles would be aligned one after the other along the length of the furnace and the molten bath flows from crucible to crucible and then onto a casting station.

Referring more particularly to FIG. 1 crucible 12 is supported in the furnace by means of a suitable support 14. The crucible contains a plurality of coolant passages 13 for the circulation of a coolant. The crucible may be made of copper and the coolant circulated may be water. Equally acceptable for some modes of operation is a refractory lined crucible without any coolant passages. A bath 15 of molten material is heated by means of an electron beam gun 16. The electron beam gun produces a beam 17 of electrons which is directed onto the surface of the molten bath 15.

In FIG. 1 the molten bath 15 may be an alloy containing high vapor pressure constituents that may vaporize and leave the liquid-gas interface of the bath. Furthermore, there may be occluded gases and volatile impurities contained in the molten bath. These constituents will also vaporize and leave the bath and condense on nearby furnace elements such as shields, furnace walls, and refractories. As condensate accumulates it may flake off and fall back into the molten bath thereby contaminating the molten material. Furthermore, solid pieces of ferromagnetic condensate may interfere with the operation of the electron beam guns and effect the electron beam thereby altering conditions of the molten bath.

In accordance with the invention, a condensate collection means 20 is positioned within the furnace proper for capturing the condensate and preventing it from falling back toward the melt. As shown in FIG. 1 the condensate collection means is suspended above crucible 12 by a plurality of supports, two of which 22 and 23 are shown.

Referring to FIG. 2, 3A, 3B, 3C, and 4, the construction of condensate collection means 20 will be readily understood. Basically, this structure consists of four principal components: a collection plate 24, a stiffening frame 29, positioning means 45, and mesh structure 50.

Figure 2:
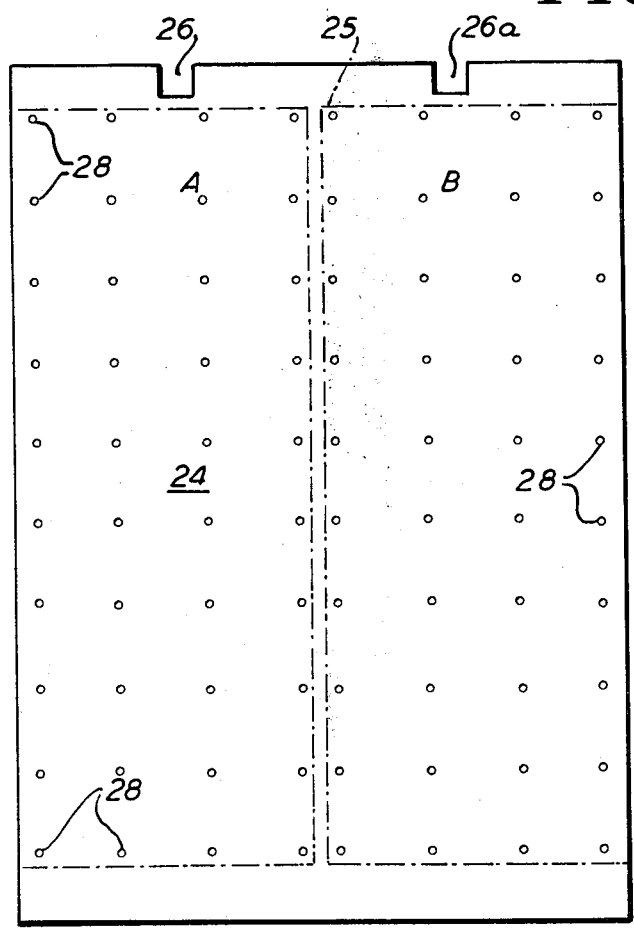
FIG. 2 is a showing in plan view of the collector plate of the condensate collecting means of the present invention.
Figure 3A:
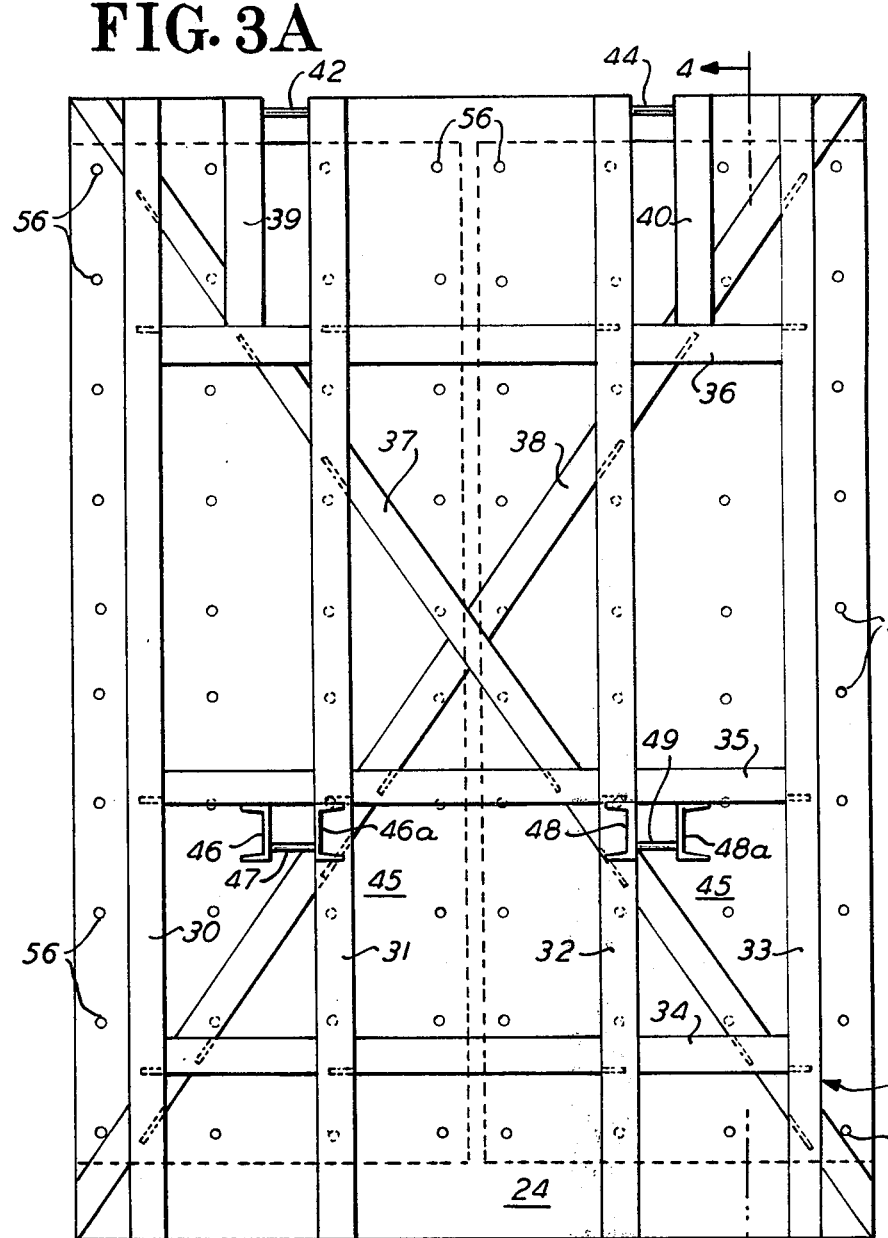
FIG. 3A, 3B, and 3C are showings in plan view, front and back elevation respectively, of the condensate collecting means of the present invention.

FIG. 2 shows a condensate collection plate 24 as a generally rectangular plate. This plate is generally made of mild steel. Disposed along upper edge 25 are two cut-outs 26 and 26a. The purpose of these cut-outs will hereinafter be discussed in greater detail. Positioned on the entire surface of the plate is a network of holes 28 for receiving fasteners. Areas A and B represent the areas that contain the condensate collection screen section 50. The collection plate should be about one-half inch thick in order to provide sufficient rigidity and support for stiffening frame 29. For purposes of clarity the network of holes 28 is not shown in its entirety in FIG. 3A.

The construction of stiffening frame 29 is shown in FIG. 3A, 3B, 3C, and 4. This structure consists of four longitudinal angle members, represented as elements 30, 31, 32, and 33. These elements are substantially equal to the length of collection plate 24. Positioned between longitudinal members 30 and 33 are transverse angle members 34, 35, and 36. The transverse members are cut away where they intersect the longitudinal members and are welded thereto. Spaced a predetermined distance from longitudinal angles 31 and 32 and parallel thereto are two short angle members 39 and 40. Positioned between members 39 and 31, 40 and 32 are round bar sections 42 and 44 respectively.

Diagonal angle members 37 and 38 extend in a diagonal manner and are also cut away where they intersect the longitudinal and transverse members. The elements of this structure are fastened together in any conventional manner, such as by welding.

Figure 4:
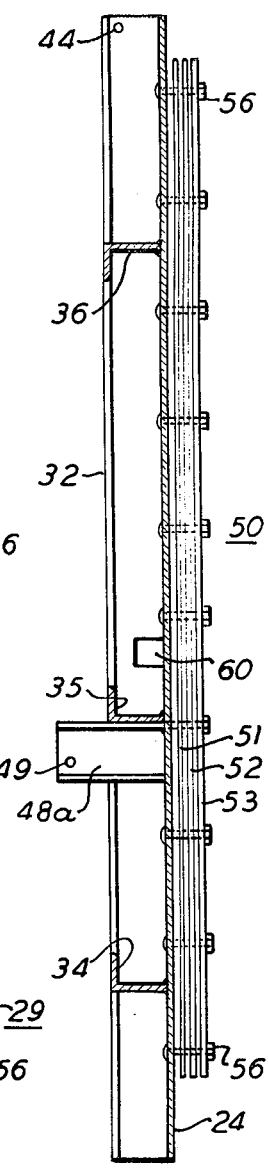
FIG. 4 is a sectional side elevational view taken along the line 4—4.
Figure 3B:
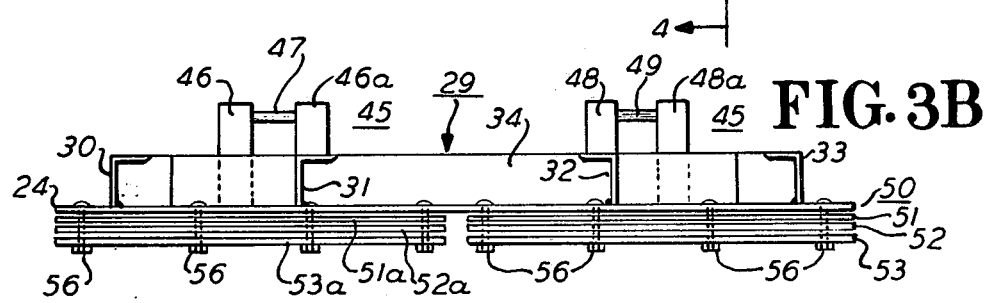
Figure 3C:
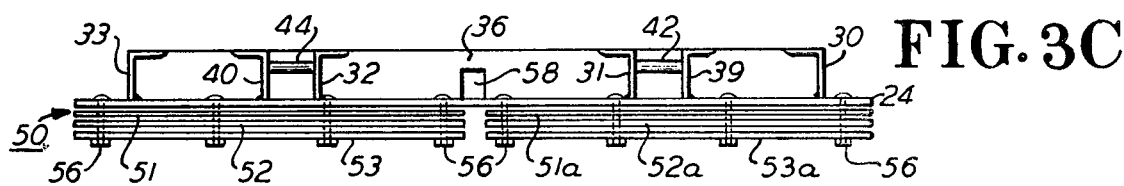

After the stiffening frame 29 has been assembled, it is fastened to the collector plate 24 as shown in FIG. 3B, 3C, and 4. A weld bead is deposited at the juncture of the toe of the angle and the surface of the collector plate. It should be understood, however, that the stiffening frame can be assembled onto the collector plate by first welding the longitudinal members, then the transverse members and so on until the entire frame is assembled.

Fastened in a perpendicular manner to the stiffening frame 29 is positioning means 45. This element consists of two-pair of channel sections. Channels 46 and 46a are positioned with their toe sections pointing away from each other and their web sections facing each other. Channel 46 is fastened to angle 35 and channel 46a is fastened to angle 31. As shown in FIG. 3B, a 1 inch diameter bar section 47 is inserted into the space between the two channel sections adjacent the upper end thereof. Channel members 48 and 48a are fastened to angles 32 and 35 in a like manner. FIG. 3B shows bar section 49 positioned between the two channel sections.

Condensate collection screen section 50 consists of three pair of mesh structures 51, 51a, 52, 52a, and 53 and 53a. These mesh structures are substantially coextensive with the surface of the collection plate 24 and face the source of the vapor. The mesh structures are of any suitable perforate construction, as for example, expanded metal and are positioned in the order of decreasing fineness towards the crucible 12, that is, the mesh structure 51, 51a is finer than the mesh structure 52, 52a, and the mesh structure 52, 52a, is finer than the mesh structure 53, 53a. In one satisfactory form of the condensate collection screen section of the invention, the mesh structure 51, 51a comprises a ½ inch by 16 gauge expanded metal sheet, the mesh structure 52, 52a comprises a ¾ inch by 9 gauge expanded metal sheet and the mesh structure 53, 53a comprises a 1½ inch by 9 gauge expanded metal sheet.

It has been found that by utilizing mesh structures in pairs, convenient, readily available, standard 4 foot widths can be purchased. It is apparent that 4 foot sections are much easier to handle than 8 foot sections. Furthermore, damage to the expanded metal sheet is greatly reduced. However, full size 8 foot sections can also be employed.

Three mesh structures 51, 52 and 53 would be stacked together and placed onto the collection plate 24 for example in area A of FIG. 2. Mesh structure 51 would be adjacent the collection plate and mesh structure 53 would be on the outside. Fasteners 56 would be inserted into the holes 28 and the mesh structures would be securely fastened to the collection plate. In a like manner mesh structures 51a, 52a, and 53a would then be fastened to area B of the collection plate.

Under operating conditions the volatile materials which first leave the molten bath 15 start condensing on the mesh structures 53, 53a, 52, 52a, and 51, 51a. A portion of the vapor, however, passes through the mesh structure and condenses on the collection plate 24. Solid pieces of the condensed material on the collection plate falling therefrom are captured between the collection plate and the mesh structure. As processing proceeds, condensation continues on the mesh structure, with the many individual surfaces acting as points for localized condensation to commence. Eventually mesh structure 50 starts to get plugged up with accumulated condensate thereby indicating that the condensate collection means should be taken out of service. Effective collection of the condensate is no longer provided by the collection means.

FIG. 3C shows that a cut-out 58 is provided in transverse angle 36. FIG. 4 shows that a cut-out 60 is provided in longitudinal angle 32. Although it is not shown a cut-out is also provided in longitudinal angle 31. These three cut-outs enable the condensate collection means to be lifted and transported into and out of the furnace proper.

As previously discussed collector plate 24 is provided with cut-outs 26 and 26a. When stiffening frame 29 is fastened to the collector plate the predetermined space between angles 39 and 31 and 40 and 32 coincides to the cut-outs so that the collector plate cut-outs and the stiffening frame spaces register with each other after the stiffening frame is fastened to the collector plate. Bars 42 and 44 then provide a means for cooperating with a bracket within the furnace proper (not shown) for maintaining the condensate collection means in position over the crucible.

Positioning means 45 are also designed for maintaining the condensate collection means in position within the furnace proper. For example, positioning means 45 may cooperate with support means 22 and 23 as shown in FIG. 1.

After a period of operation, the mesh structures become plugged with condensate and collection of vapor can no longer be accomplished. The condensate collection means is then removed from the furnace proper. Most of the accumulated condensate can be rapidly dislodged by merely dropping the collection means onto the melt shop floor from a short height. The more tenaciously adhering particles can be removed in any convenient manner as for example by wire brushing.

It may, therefore, be seen that the invention provides an improved condensate collection means for use in a furnace for processing material subject to vaporization. The invention provides a very sturdy and durable means for collecting condensate. The invention can be rapidly cleaned and maintained.

Various modifications of the invention in addition to those shown and described herein will become apparent to those skilled in the art from the foregoing description and accompanying drawings. Such modifications are intended to fall within the scope of the appendant claims.

I claim:

1. In a furnace for processing materials subject to vaporization, and including a condensate collecting means comprising a surface adapted for positioning in the path of vapor, and at least one mesh structure positioned adjacent said surface and substantially coextensive therewith for positioning in the path of vapor, and support means within said furnace for engaging and supporting said condensate collecting means, wherein the improvement comprises;
    a. a substantially flat, rectangular collector plate;
    b. a stiffening frame fastened to the surface of said plate which is not in the path of vapor and substantially coextensive with said plate;
    c. positioning means fastened to said stiffening frame and adapted to cooperate with said furnace support means; and
    d. a substantially flat mesh structure fastened to the surface of said plate which is in the path of vapor and substantially coextensive therewith.

2. A condensate collecting means as recited in claim 1, wherein said collector plate further comprises:
    e. a pair of cut-out portions at one edge of said plate.

3. A condensate collecting means as recited in claim 1, wherein said stiffening frame further compromises:
    f. a plurality of first longitudinally extending members substantially equal in length to said plate;
    g. a plurality of transversely extending members interposed between said longitudinally extending members; and
    h. a pair of diagonally extending members.

4. A condensate collecting means as recited in claim 3, wherein said stiffening frame further comprises:
    i. a pair of second longitudinally extending members extending from an outside transverse member to the end of said first longitudinally extending members and spaced from said first longitudinally extending members a distance equal to said plate cut-out portions; and
    j. a pair of bars inserted into the spaces between said first longitudinally extending members and said second longitudinally extending members.

5. A condensate collecting means as recited in claim 4, wherein said stiffening frame further comprises:
    k. at least one cut-out portion in a first longitudinally extending member and at least one cut-out portion in a transversely extending member for facilitating movement of said condensate collecting means.

6. A condensate collecting means as recited in claim 1, wherein said positioning means further comprises:
    1. a first pair of channel members and a second pair of channel members positioned in a perpendicular manner to said stiffening frame and fastened to said first longitudinal and said transverse members; and
    m. a pair of bars inserted between each of said pair of channels adjacent the upper ends thereof.

7. A condensate collecting means as recited in claim 1, wherein said mesh structure further comprises:
    n. at least one mesh structure being sufficiently porous to suitably allow vapor to pass through to said collection plate and being sufficiently fine as to retain solid pieces of condensate on said mesh structure.

8. A condensate collecting means as recited in claim 7, wherein said mesh structure further comprises:
    o. a plurality of mesh structures substantially coextensive with said collector plate, each of said mesh structures being of a different mesh size wherein the mesh structure adjacent the collector plate being the finest mesh and the mesh structure being of decreasing fineness away from said collector plate.

* * * * *